Oct. 18, 1932.　　G. W. CUNNINGHAM　　1,883,596
OIL SAVER
Filed April 29, 1930　　2 Sheets-Sheet 1
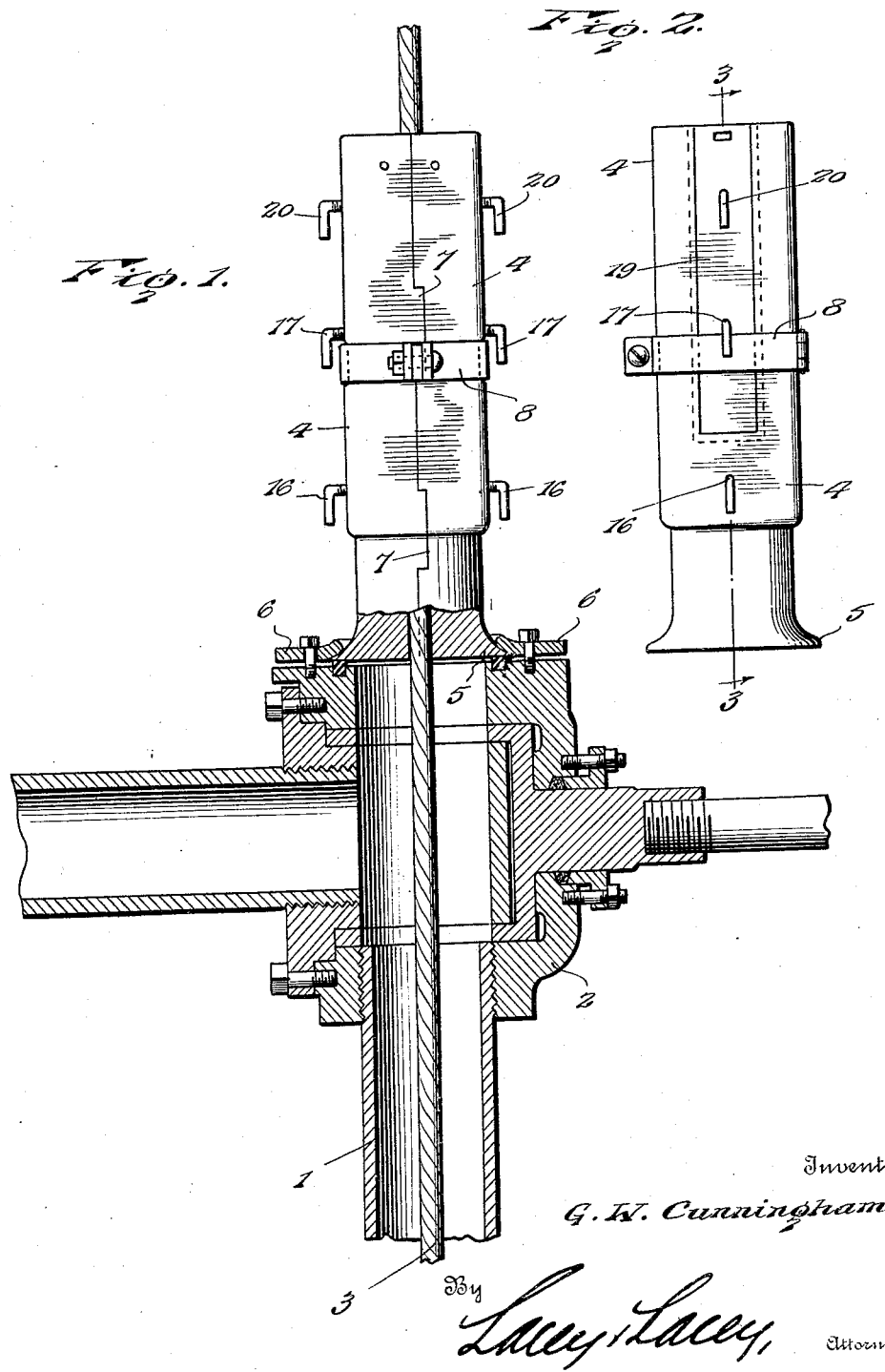

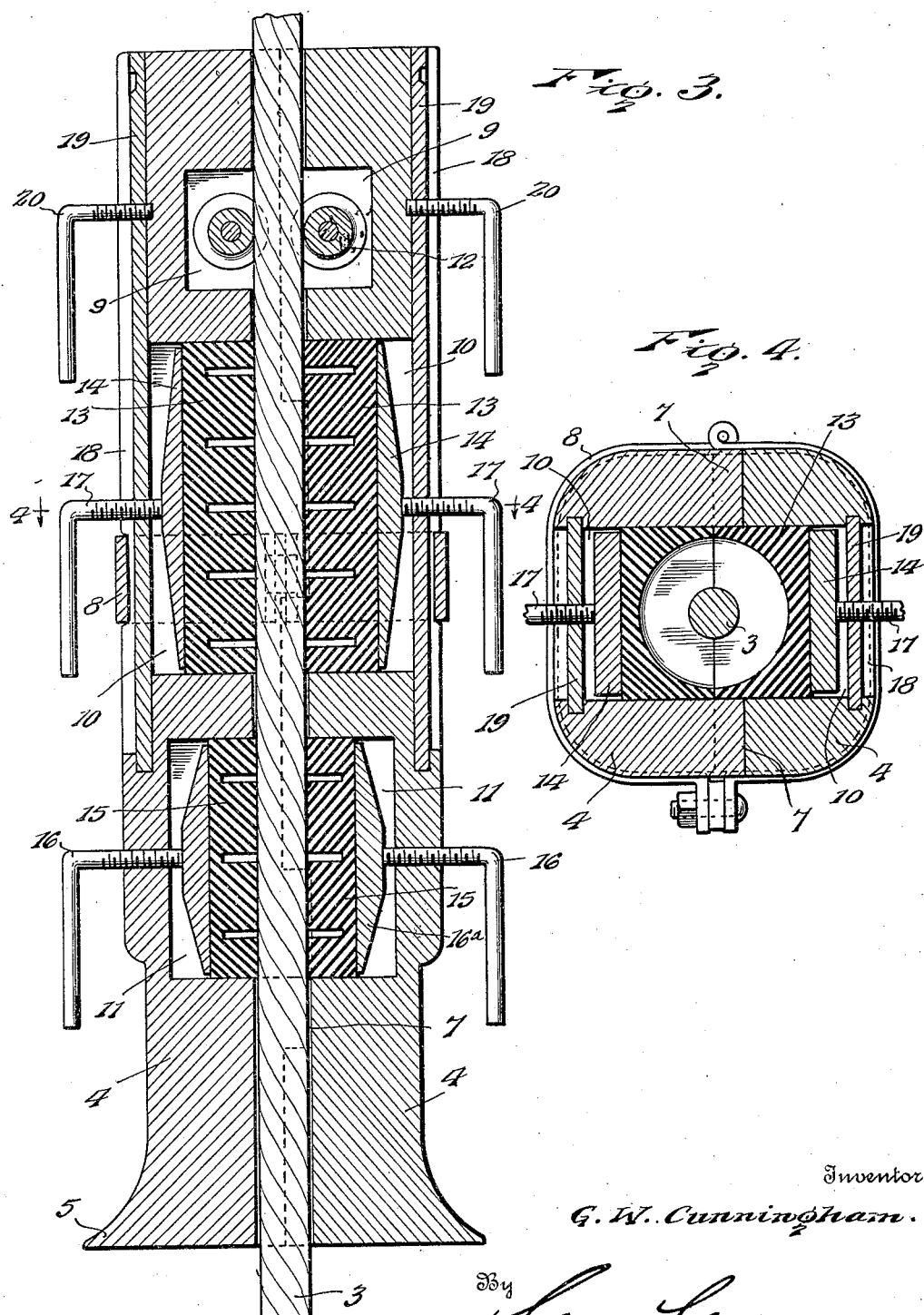

Patented Oct. 18, 1932

1,883,596

UNITED STATES PATENT OFFICE

GEORGE W. CUNNINGHAM, OF SEMINOLE, OKLAHOMA

OIL SAVER

Application filed April 29, 1930. Serial No. 448,339.

This invention relates to deep wells for the production of oil and gas and provides means to prevent waste of production during the drilling and slushing of the well.

The invention provides an attachment which may be easily and quickly placed in position or removed from the casing and which maintains a close joint with the drill line to prevent loss of oil.

While the drawings illustrate a preferred embodiment of the invention, it is to be understood that in adapting the means to meet specific needs and requirements, the design may be varied and changes in the minor details of construction may be resorted to within the scope of the invention as claimed without departing from the spirit thereof.

For a full understanding of the invention and the merits thereof, reference is to be had to the following description and the drawings hereto attached, in which:

Figure 1 is an elevational view of an oil saver embodying the invention and showing it applied, the casing and casing head being in section.

Figure 2 is a side view of the oil saver at right angles to Figure 1.

Figure 3 is an enlarged sectional view on the line 3—3 of Figure 2.

Figure 4 is a horizontal sectional view on the line 4—4 of Figure 3.

Corresponding and like parts are referred to in the following description and designated in the several views of the drawings by like reference characters.

The numeral 1 designates the well casing to the upper end of which is fitted a casing head 2 of any make or construction. The bull rope or drill line 3 is shown to demonstrate the application of the invention and is representative of the usual part for operating the drill and other tools in the deepening and slushing of the well.

The oil saver comprises similar sections or halves 4 and is flared or provided with a flange 5 at its lower end to engage the casing head 2 to which it is secured by means of lugs 6 or in any determinate way. Matching lugs and recesses 7 maintain the sections 4 in alinement, a clamp band 8 embracing the parts 4 to secure them when assembled. The clamp 8 is seated in a groove which prevents displacement and assures proper positioning of the clamp when adjusted upon the body of the device.

Each of the sections 4 of the oil saver is centrally grooved in its inner or meeting face to provide an opening when the sections are placed together, for the passage of the drill element 3. There are also provided recesses 9, 10 and 11 at different points. A guide roller 12 is located in the recess 9. The recess 10 receives a packing 13 and a follower 14. The recess 11 contains a packing 15 and a follower 16a. The packings fit closely within the respective recesses and snugly engage the part 3 to prevent waste of oil.

An adjusting screw 16 is threaded in an opening of the wall opposite the recess 11 and engages the follower 16a to move it inward and maintain close engagement of the packing 15 with the part 3. An adjusting screw 17 is associated with the follower 14 for adjustment thereof to insure a close fit between the packing 13 and the part 3. A channel 18 is formed in the outer side of each of the sections 4 and intersects the recess 10. A plate 19 is slidable in the groove or channel 18 and closes the outer side of the recess 10 and receives the adjusting screw 17 which is threaded therein. A screw 20 threaded into the upper portion of the plate 19 engages the section 4 and retains the plate when slid to position within the groove or channel 18. As indicated most clearly in Figures 3 and 4 of the drawings, the bottom and side walls of the groove or channel 18 are undercut to receive the bottom and side edge portions of the plate 19. The recesses 10 are readily accessible upon removal of the plate 19, thereby admitting of replacement of the packing 13 without necessitating detachment or removal of the oil saver from the casing head 2 and member 3. The clamp band 8 provides means to permit of easily and quickly placing the device in position or removing it from the casing and part 3, as will be readily appreciated.

What is claimed is:

An oil saver consisting of mating sections having openings therethrough to receive packing and provided marginally on their meeting faces with engaging lugs and recesses to prevent relative endwise movement of the sections and each section being provided in its outer side with a vertical channel intersecting the opening through the section and being provided with grooves in the bottom and side walls of said channel, plates engaging in said grooves and co-extensive with the channels to cover the outer ends of the openings through the mating sections and extend to the upper ends of the respective mating sections, packing in the openings through the mating sections, securing screws mounted in said plates and bearing upon the packing, and other screws mounted in the upper end portions of the plates to engage the respective mating sections and lock the plates in position.

In testimony whereof I affix my signature.

GEORGE W. CUNNINGHAM. [L. S.]